US007620067B2

(12) United States Patent
Niu et al.

(10) Patent No.: US 7,620,067 B2
(45) Date of Patent: Nov. 17, 2009

(54) METHOD OF SWITCHING TRANSMISSION MODES IN IEEE 802.11N MIMO COMMUNICATION SYSTEMS

(75) Inventors: Huaning Niu, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 634 days.

(21) Appl. No.: 11/317,058

(22) Filed: Dec. 22, 2005

(65) Prior Publication Data

US 2007/0147414 A1 Jun. 28, 2007

(51) Int. Cl.
*H04J 3/16* (2006.01)
(52) U.S. Cl. ...................................................... 370/465
(58) Field of Classification Search ................. None
See application file for complete search history.

(56) References Cited

U.S. PATENT DOCUMENTS

| 7,120,199 | B2 | 10/2006 | Thielecke et al. |
| 7,242,724 | B2 | 7/2007 | Alexiou et al. |
| 7,263,132 | B2 | 8/2007 | Horng et al. |
| 7,327,795 | B2 | 2/2008 | Oprea |
| 2003/0123598 | A1 | 7/2003 | Gollamudi et al. |
| 2003/0231706 | A1 | 12/2003 | Hwang |
| 2003/0236080 | A1 | 12/2003 | Kadous et al. |
| 2005/0237971 | A1* | 10/2005 | Skraparlis ............... 370/329 |
| 2006/0114858 | A1 | 6/2006 | Walton et al. |
| 2006/0221920 | A1* | 10/2006 | Gopalakrishnan et al. ... 370/338 |
| 2007/0140363 | A1 | 6/2007 | Horng et al. |

OTHER PUBLICATIONS

G. Foschini, "Layered space-time architecture for wireless communication in a fading environment when using multi-element antennas," Bell Labs Tech. J., 1996, pp. 41-59, vol. 1, No. 2.
V. Tarokh, N. Seshadri and A.R. Calderbank, "Space-time codes for high data rate wireless communication: Performance criterion and code construction", IEEE Trans. On Information Theory, Mar. 1998, pp. 744-765. vol. 44, No. 2.
S.A. Mujtaba, "TGn Sync Proposal Technical Specification," doc.: IEEE 802.11-04/0889r6, May 2005, pp. 1-131.
L. Zheng and D. Tse, "Diversity and Mulitplexing: A Fundamental Tradeoff in Multiple-Antenna Channels," IEEE Trans. Info. Theory, May 2003, pp. 1073-1096, vol. 49, No. 2.

(Continued)

*Primary Examiner*—William Trost, IV
*Assistant Examiner*—Raj Jain
(74) *Attorney, Agent, or Firm*—Kenneth L. Sherman, Esq.; Michael Zarrabian, Esq.; Myers Andras Sherman LLP (57) ABSTRACT

A method and system is provided that selects transmission modes between spatial multiplexing, delay diversity and space-time coding in 802.11n systems. As such, eigen-value computation for mode selection is not required. This provides efficiency, in particular for basic receiver structure where a linear MMSE or ZF MIMO detector is applied. Further, mode selection using a simple metric provides accurate mode selection. In addition by switching between different transmission modes, a link adaptation algorithm according to the present invention provides improved system performance.

35 Claims, 9 Drawing Sheets

OTHER PUBLICATIONS

Mujtaba, S.A., "TGn Sync Proposal Technical Specification," a contribution to doc: IEEE 802.11-04889r0, Aug. 2004, pp. 1-138.

Shiu, Da-Shan, Foschini, G.J., Gans, M.J., and Kahn, J.M., "Fading Correlation and its Effect on the Capacity of Multielement Antenna Systems," IEEE Trans. Communication, pp. 502-513, Mar. 2000, vol. 48, No. 3.

Mujtaba, S.A., "TGn Sync Proposal Technical Specification," a contribution to IEEE 802.11, 11-04-889r1, Nov. 2004, pp. 1-144.

Holland, G., Vaidya, N., and Bahl, P., "A Rate Adaptive MAC Protocol for Multi-Hop Wireless Networks," ACM/ IEEE Int. Conf. on Mobile Computing and Networking (Mobicom'01), Rome, Italy, Jul. 2001.

Lin, Z., Malmgren, G., and Torsner, J., "System Performance Analysis of Link Adaptation in HiperLAN Type 2," Proc. IEEE Vehicular Technology Conference, May 2000, vol. 4, pp. 1719-1725.

U.S. Office Action for U.S. Appl. No. 11/317,826 mailed Dec. 11, 2008.

Mujtaba, S.A., "TGn Sync Proposal Technical Specification", Jul. 2005, IEEE 802.11 TGn, IEEE 802.11-04/0889r7.

U.S. Office Action for U.S. Appl. No. 11/317,826 (SAM2B.PAU.33) mailed Jun. 15, 2009 by Examiner Ahn, Sung S.

* cited by examiner

METHOD OF SWITCHING TRANSMISSION MODES IN IEEE 802.11N MIMO COMMUNICATION SYSTEMS

FILED OF THE INVENTION

The present invention relates generally to wireless communications, and in particular to IEEE 802.11n multiple-input-multiple-output (MIMO) wireless communication systems.

BACKGROUND OF THE INVENTION

In the field of wireless communications, multiple-input-multiple-output (MIMO) is one of the promising schemes to increase system link robustness and spectral efficiency. The basic idea of spatial diversity is that multiple antennas are less likely to fade simultaneously than a single antenna element. Diversity techniques increase the average signal-to-noise-ratio (SNR) by means of coherent combining. Space-time coding is a particularly attractive approach to realize transmit-diversity gain without requiring channel knowledge at the transmitter. Another type of diversity scheme is delay diversity, where each transmit antenna sends a delayed version of the same signal, which can be readily exploited through the use of coded orthogonal frequency division multiplexing (OFDM).

Employing multiple antennas at both ends of the wireless link can dramatically increase the bit rate using the spatial multiplexing scheme. Spatial multiplexing multiplexes a high rate signal into multiple bit-streams, and then transmits them simultaneously using multiple antennas, allowing a linear capacity increase.

However, a spatial multiplexing scheme requires a rich scattering environment. For channels that are less amenable to spatial multiplexing (e.g., for near line of sight stations, antenna correlation, etc.), spatial diversity is used where transmit-receive antenna diversity is exploited. Therefore, spatial multiplexing and spatial diversity are complementary approaches when using multiple antennas. In the TGn Sync technical specification, S. A. Mujtaba, "TGn Sync Proposal Technical Specification," a contribution to IEEE 802.11, 11-04-0889r56, May 2005 (incorporated herein by reference), spatial multiplexing, space-time coding and delay diversity are all specified as transmission schemes. The intelligence for mode switching between spatial multiplexing, delay diversity and space-time coding located in the link adaptation module, as an extension of adaptive coding and modulation scheme, plays an important role in achieving the IEEE 802.11n system capacity.

Conventional approaches focus on designing schemes to extract either maximal diversity gain or maximal spatial multiplexing gain. L. Zheng and D. Tse, "Diversity and multiplexing: a fundamental tradeoff in multiple-antenna channels," IEEE Trans. Info. Theory, vol. 49, May 2003, presents a fundamental tradeoff between how much each coding scheme can get. However, no detailed workable algorithm is provided by the conventional systems.

BRIEF SUMMARY OF THE INVENTION

In one embodiment the present invention provides smart switching between transmission modes in IEEE 802.11n systems, to achieve the best performance out of the available modes. A method and system is provided that selects transmission modes between spatial multiplexing, delay diversity and space-time coding in IEEE 802.11n systems, to achieve the best performance out of the three modes. As such, eigen-value computation for mode selection is not required. This provides computational efficiency, in particular for basic receiver structure where a linear MMSE or ZF MIMO detector is applied. Further, mode selection using a simple decision metric provides accurate mode selection. In addition by switching between different transmission modes, a link adaptation algorithm according to the present invention provides improved system performance.

The present invention provides a method of switching modes between spatial multiplexing, delay diversity and space-time coding in IEEE 802.11n systems system based on the decision metric D termed "Post-detection constellation-coding SNR". The decision metric D takes into consideration the constellation distance and coding rate, and therefore provides an effective metric to compare different MCSs.

In one implementation, determining said decision metric (D) and switching transmission modes based on the decision metric includes the steps of: Estimating the channel information based on long preamble; Computing the post-detection SNR ($\rho_{MIMO}$) for different transmission modes; Computing the coding loss of higher coding rate ($\rho_{coding}$) and the squared min-distance of constellation ($d^2_{min-constellation}$) for different MCS with the same transmission rates; Computing the decision metric D for different transmission modes; and Selecting the transmission mode with the largest D and feeding back the information to the transmitter.

These and other features, aspects and advantages of the present invention will become understood with reference to the following description, appended claims and accompanying figures.

DETAILED DESCRIPTION OF THE INVENTION

In one embodiment the present invention provides smart switching between transmission modes in IEEE 802.11n systems, to achieve the highest throughput out of the available modes. A method and system is provided that selects transmission modes between spatial multiplexing, delay diversity and space-time coding in IEEE 802.11n systems, to achieve the best performance out of the three modes. As such, eigenvalue computation for mode selection is not required. This provides computational efficiency, in particular for basic receiver structure where a linear MMSE or ZF MIMO detector is applied. Further, mode selection using a simple metric provides accurate mode selection. In addition by switching between different transmission modes, a link adaptation algorithm according to the present invention provides improved system performance.

A. Basic MCS (Modulation Coding Scheme) Set and Three Trasmission Mode in TGn Sync 802.11n Specification:

The basic modulation coding scheme (MCS) set is defined in the aforementioned S. A. Mujtaba, "TGn Sync Proposal Technical Specification," a contribution to IEEE 802.11, 11-04-0889r56, May 2005 (incorporated herein by reference). It consists of 8 modulation/code rate combinations supporting 1, 2, 3, and 4 spatial streams, plus a 6 Mbps duplicate mode for 40 MHz operation. Support of MCS 0 through MCS 15 (the basic MCSs supporting single-stream and two-stream operation) is mandatory. Support of MCS 16 through MCS 32 is optional. Different MCSs sometimes give exactly the same PHY data rate, (e.g., MCS 3 and 9 etc). Different modes are defined to transmit those MCS sets.

1. Direct Mapping Spatial Multiplexing

Figure 1:
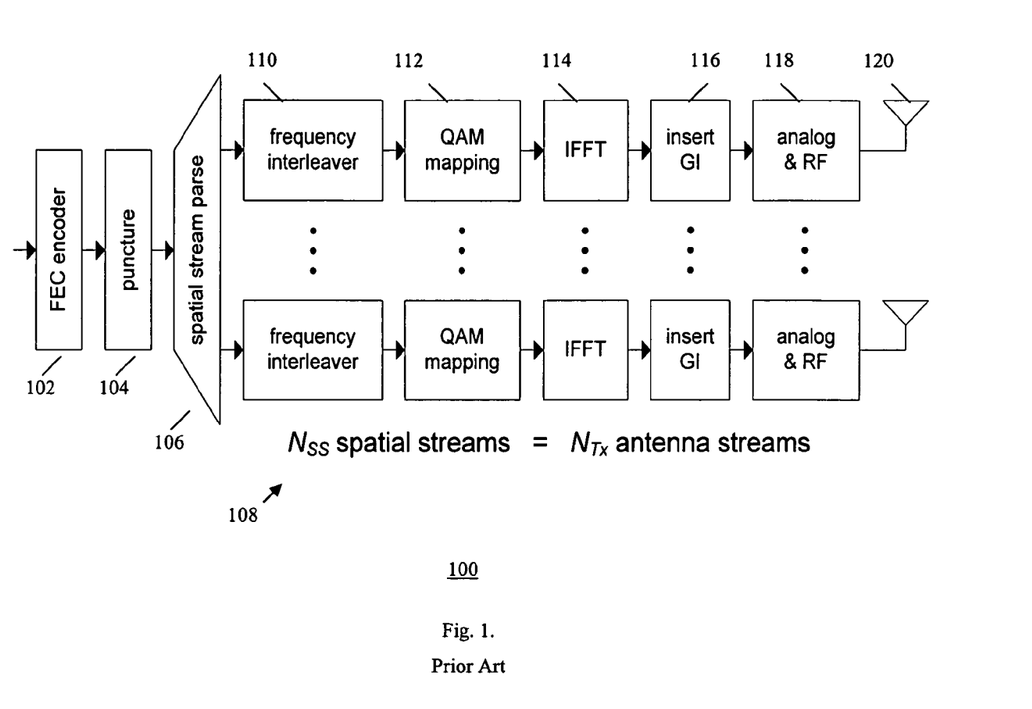
FIG. 1 illustrates an example simplified datapath in a conventional MIMO transmitter for direct mapped MIMO.

Direct mapped MIMO is the simplest antenna mapping transformation, where each spatial stream maps to one antenna. Hence, there is a one-to-one correspondence between spatial streams and transmit antennas. FIG. 1 illustrates a conventional example of a simplified direct map datapath 100 in a MIMO transmitter for direct mapped MIMO. The datapath 100 comprises an FEC (forward error correction) encoder 102 that encodes an input bit stream, a puncturer 104, a spatial stream parser 106 that generates $N_{SS}$ spatial streams for $N_{SS}$ stream paths 108, wherein each stream path 108 comprises a frequency interleaver 110, a QAM (Quadrature Amplitude Modulation) mapper 2, an inverse Fast Fourier Transform (IFFT) module 114, a guard interval window (GI) insert module 116, and an analog & RF module 118 connected to an antenna 120 wherein $N_{SS}$ spatial streams=$N_{Tx}$ transmit antennas. Direct mapped MIMO only utilizes as many antennas ($N_{Tx}$) as there are spatial streams ($N_{SS}$) (i.e., $N_{SS}=N_{Tx}$).

For the transmitter TX, in the unit 102 the source bit stream is encoded by a channel encoder and a puncturer 104 punctures the bits to change the coding rate. The spatial parser 106 separates the data stream into several (one or more) spatial streams 108. The frequency interleaver 110 interleaves the encoded bit using a block interleaver, and the interleaved bits are mapped to symbols by a constellation mapper 112 using a Gray Mapping Rule. The IFFT unit 114 performs the OFDM modulation which converts the frequency domain signals to time domain signals. Guard interval is inserted in unit 116 which eliminates the inter-symbol interference in the transmission. In the RF modulator 118, the signal is RF modulated and transmitted through the strongest channel via antennas 120.

2. Spatial Spreading with Delay Diversity

Spatial spreading is a way to map spatial streams when the number of spatial streams is less than the number of transmitting antennas (i.e., $N_{SS}<N_{Tx}$). The basic spatial spreading function is achieved using the first $N_{SS}$ columns of a fixed $N_{Tx} \times N_{Tx}$ unitary matrix W. The same matrix W is used for all subcarriers. Typically, W is a Walsh Hadamard matrix for $N_{Tx}=2$ and 4, or a Fourier matrix for $N_{Tx}=3$. Time-domain cyclic delays are applied to OFDM symbols prior to GI insertion, which is referred to as Cyclic Delay Diversity (CDD). Since the unitary spatial spreading matrix is typically the Walsh Hadamard matrix, this method is often called "Walsh+CDD", as shown by the conventional example transmission datapath 200 in FIG. 2. The datapath 200 comprises an FEC encoder 202 that encodes an input bit stream, a puncturer 204, a spatial stream parser 206 that generates $N_{SS}$ spatial streams for $N_{SS}$ stream paths 208, wherein each stream path 208 comprises a frequency interleaver 210, and a QAM mapper 212. The $N_{SS}$ spatial streams are provided to a unitary matrix W module 214 which generates $N_{Tx}$ antenna streams for $N_{Tx}$ antenna paths 215. The first antenna stream path 215 comprises an inverse Fast Fourier Transform (IFFT) module 216, a guard interval window (GI) insert module 218, and an analog & RF module 220 connected to an antenna 222. Each remaining antenna stream path 215 comprises an inverse Fast Fourier Transform (IFFT) module 216, a cyclic delay module 217, a guard interval window (GI) insert module 218, and an analog & RF module 220 connected to an antenna 222.

Figure 2:
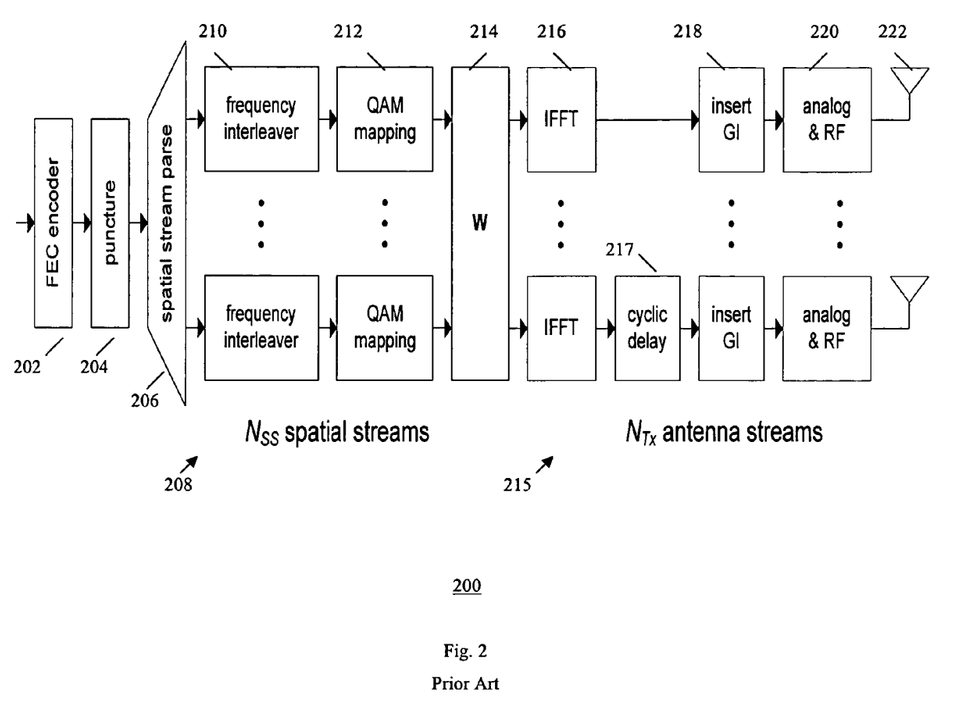
FIG. 2 illustrates a conventional time domain implementation of spatial spreading cyclic delay mode transmission datapath.

In the unit 202 the source bit stream is encoded by a channel encoder and a puncturer 204 punctures the bits to change the coding rate. The spatial parser 206 separates the data stream into several (two or more) spatial streams 208. The frequency interleaver 210 interleaves the encoded bit using a block interleaver; and the interleaved bits are mapped to symbols by a constellation mapper 212 using a Gray Mapping Rule. The $N_{SS}$ data streams go through a unitary spreading matrix W (unit 214) which maps $N_{SS}$ data streams to Ntx transmit antennas. The matrix W can be any unitary matrix. For example, it can be a FFT matrix for Ntx=3, and Walsh Hadamard matrix for Ntx=4. The IFFT unit 216 performs the OFDM modulation which converts the frequency domain signals to time domain signals. Cyclic delay is inserted by unit 217 for Ntx>1 to increase the delay diversity of the system. Guard interval is inserted by unit 218 which eliminate the inter-symbol interference in the transmission. In the RF modulator 220, the signal is RF modulated and transmitted through the strongest channel via antennas 222.

3. Space-Time Block Coding (STBC)

When $N_{SS}=1$ and $N_{Tx}=2$, the Alamouti scheme is applied. For each sequential pair of input symbols in the input modulation symbol stream, the STBC processing generates two output symbol vectors as follows: Given two sequential input symbols $s_l(2k)$ and $s_l(2k+1)$, the STBC processing generates two sequential output symbol vectors $x_l(2k)$ and $x_l(2k+1)$ given by:

$$x_l(2k) = \begin{bmatrix} s_l(2k) \\ -s_l^*(2k+1) \end{bmatrix}, \text{ and}$$

$$x_l(2k+1) = \begin{bmatrix} s_l(2k+1) \\ s_l^*(2k) \end{bmatrix}.$$

Figure 3:
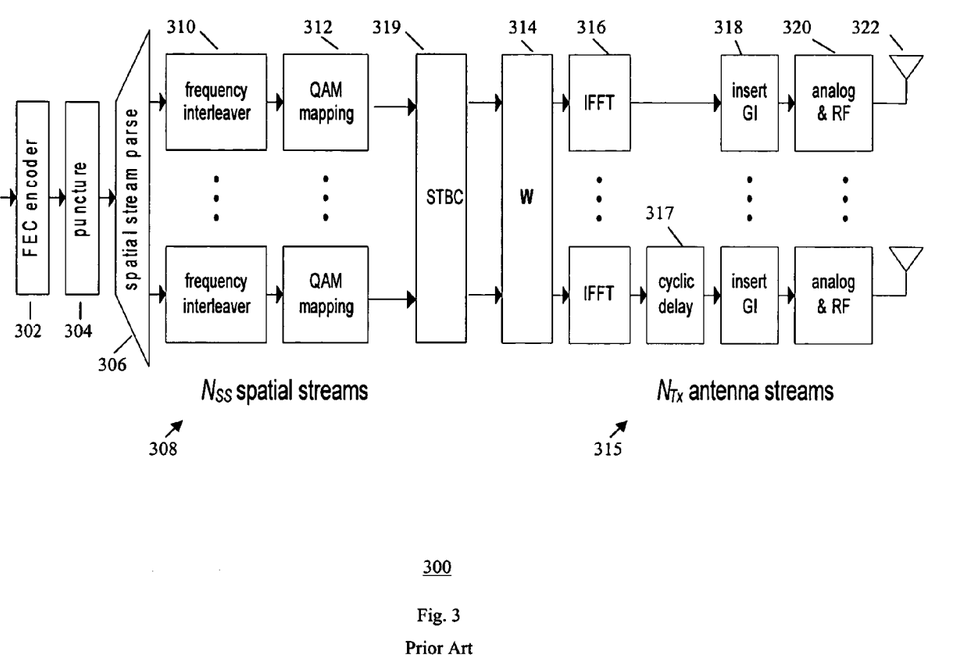
FIG. 3 illustrates conventional STBC with Walsh-CDD transmission datapath.

When $N_{Tx}>2$, the Walsh-CDD can be applied to map the transmission streams to multiple antennas as shown by the conventional example transmission datapath 300 in FIG. 3. The datapath 300 comprises an FEC encoder 302 that encodes an input bit stream, a puncturer 304, a spatial stream parser 306 that generates $N_{SS}$ spatial streams for $N_{SS}$ stream paths 308, wherein each stream path 308 comprises a frequency interleaver 310, and a QAM mapper 312. The $N_{SS}$ spatial streams are provided to a STBC module 319, and the streams from the STBC module 319 are provided to a unitary matrix W module 314 which generates $N_{Tx}$ antenna streams for $N_{Tx}$ antenna paths 315. The first antenna stream path 315 comprises an inverse Fast Fourier Transform (IFFT) module 316, a guard interval window (GI) insert module 318, and an analog & RF module 320 connected to an antenna 322. Each remaining antenna stream path 315 comprises an inverse Fast Fourier Transform (IFFT) module 316, a cyclic delay module 317, a guard interval window (GI) insert module 318, and an analog & RF module 320 connected to an antenna 322. In one example STBC 319, there is one input stream $N_{SS}=1$ and two output paths, in another example with other encoding method number of STBC input streams can be $N_{SS}=2, 3$, etc. wherein output paths can be 3, 4, etc.

In the unit 302 the source bit stream is encoded by a channel encoder and a puncturer 304 punctures the bits to change the coding rate. The spatial parser 306 separates the data stream into several (one or two) spatial streams 308. The frequency interleaver 310 interleaves the encoded bits using a block interleaver, and the interleaved bits are mapped to symbols by the constellation mapper 312 using a Gray Mapping Rule. The $N_{SS}$ data streams go through the STBC model (unit 319) which encodes the streams using a space-time code. The output of STBC encoded data streams go through a unitary spreading matrix W (unit 314) which maps number of STBC encoded data streams to Ntx transmit antennas. The matrix W can be any unitary matrix. For example, it can be a FFT matrix for Ntx=3, and Walsh Hadamard matrix for Ntx=4. The IFFT unit 316 performs the OFDM modulation which converts the frequency domain signals to time domain signals. Cyclic delay is inserted in unit 317 for Ntx>1 to increase the delay diversity of the system. Guard interval is inserted in unit 318 which eliminates the inter-symbol interference in the transmission. In the RF modulator 320, the signal is RF modulated and transmitted through the strongest channel via antennas 322.

For $N_{SS}=2$, and $N_{Tx}=4$, double STBC can be applied where each stream is coded independently as shown above.

Figure 4:
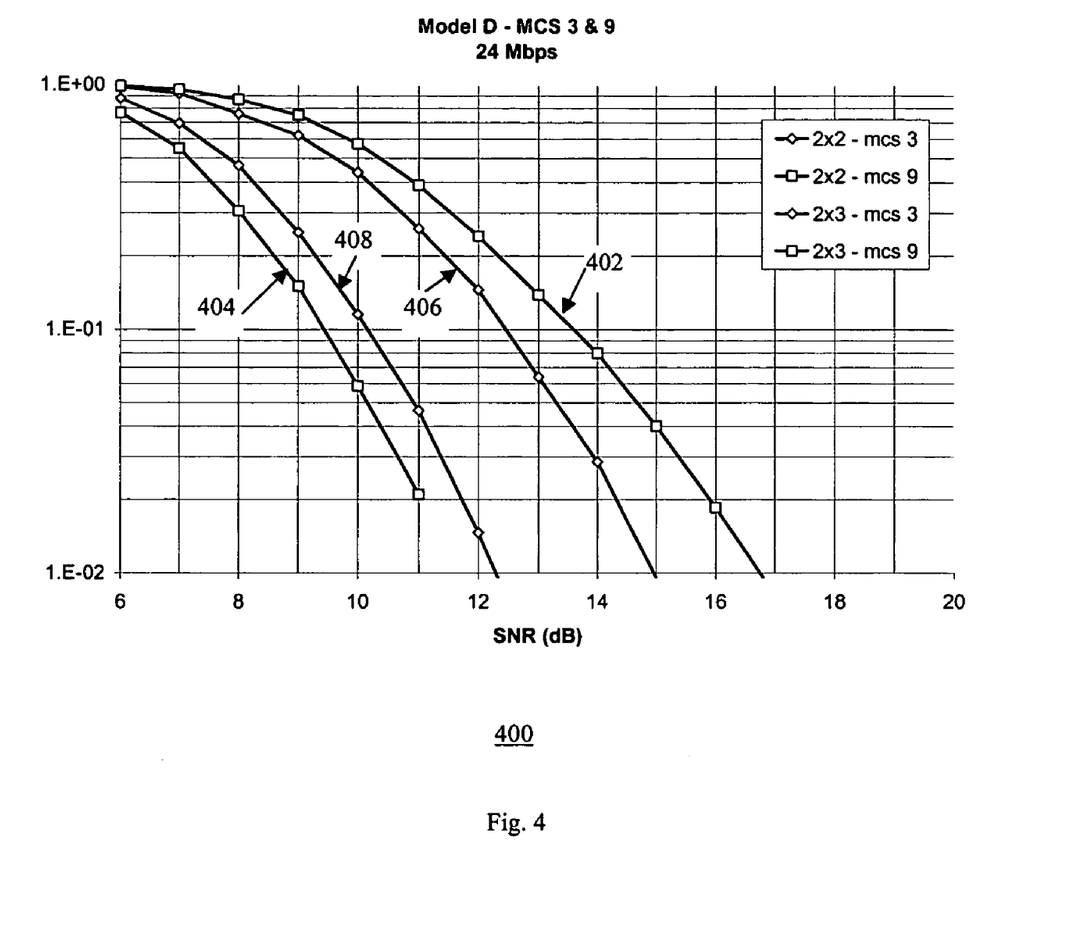
FIG. 4 shows example PER performance comparison of direct mapping (MCS 9) and Walsh-CDD (MCS 3) over D-NLOS channel.
Figure 5:
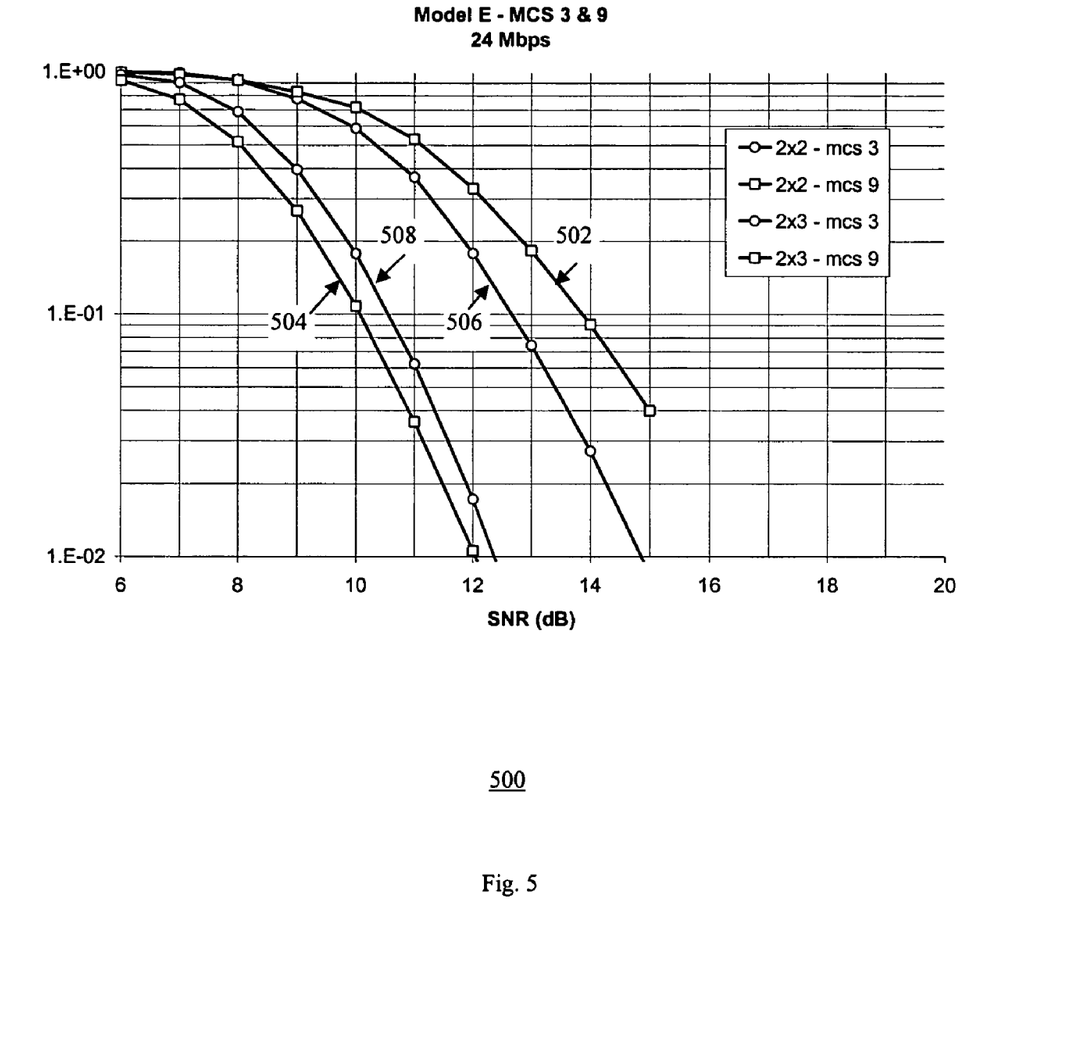
FIG. 5 shows example PER performance comparison of direct mapping (MCS 9) and Walsh-CDD (MCS 3) over E-NLOS channel.

B. Switching Between Transmission Modes in TGn Sync 802.11n Specification:

As the aforementioned S. A. Mujtaba, "TGn Sync Proposal Technical Specification," a contribution to IEEE 802.11, 11-04-0889r56, May 2005 (incorporated herein by reference), defines multiple MCSs (Modulation and Coding Schemes) for the same transmission rate, selecting the appropriate modes based on the system configuration and channel condition is the key to achieving high throughput gains. For example, MCS 3 (signal stream, 16QAM, ½ coding) and MCS 9 (two data streams, QPSK, ½ coding) provide exactly the same PHY data rate. For a MIMO system with 2 transmit antennas and 2 receiver antennas, transmitting MCS 3 with Walsh+CDD mode has better performance over both channels D and E, as shown by example performance graphs in FIGS. 4-5. Specifically, FIG. 4 shows graphs 400 for PER (packet error rate) vs. signal-to-noise-ratio (SNR) performance comparison of direct mapping (MCS 9) (i.e., 2×2 MCS 9 performance graph 402 and 2×3 MCS 9 performance graph 404, wherein 2×2 means 2 transmit antennas, 2 receive antennas; 2×3 means 2 transmit antennas, 3 receive antennas, etc.) and Walsh-CDD (MCS 3) (i.e., 2×2 MCS 3 performance graph 406 and 2×3 MCS 3 performance graph 408) over a D-NLOS channel. Further, FIG. 5 shows graphs 500 for PER vs. signal-to-noise-ratio (SNR) performance comparison of direct mapping (MCS 9) (i.e., 2×2 MCS 9 performance graph 502 and 2×3 MCS 9 performance graph 504) and Walsh-CDD (MCS 3) (i.e., 2×2 MCS 3 performance graph 506 and 2×3 MCS 3 performance graph 508) over a E-NLOS channel.

Figure 6:
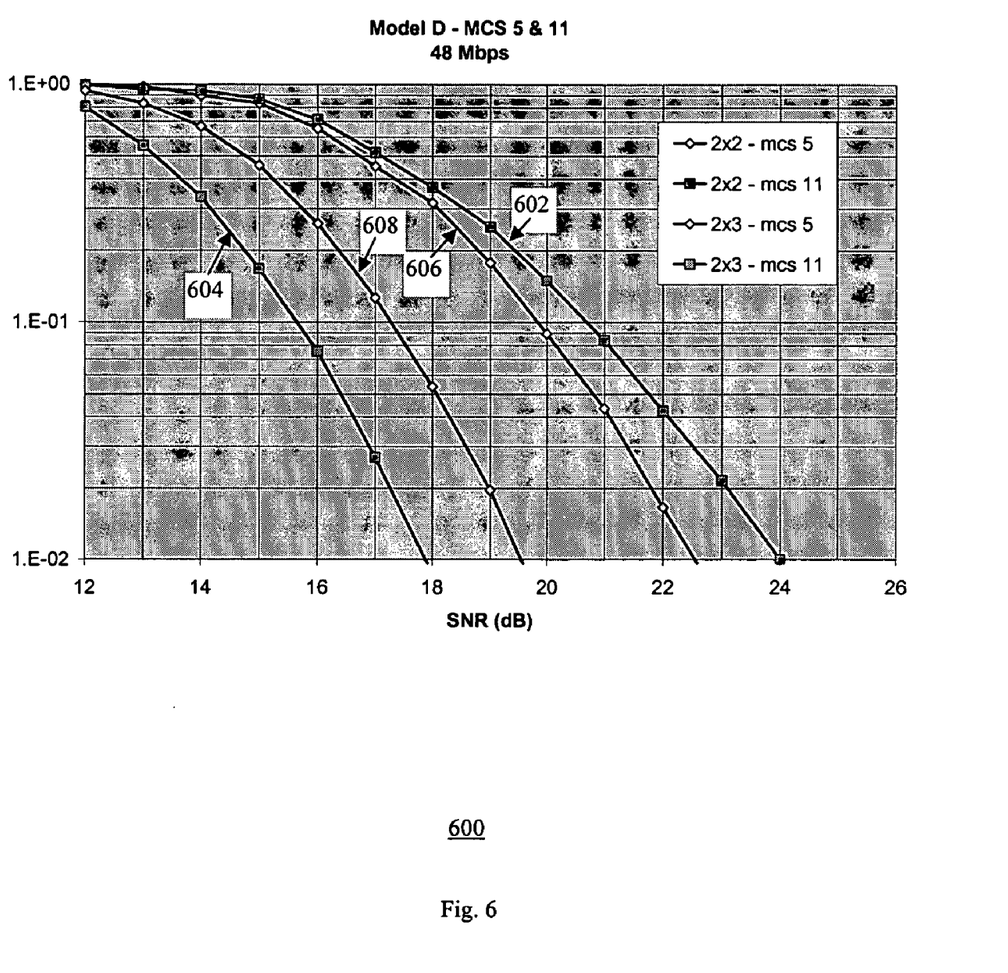
FIG. 6 shows example PER performance comparison of direct mapping (MCS 11) and Walsh-CDD (MCS 5) over D-NLOS channel.
Figure 7:
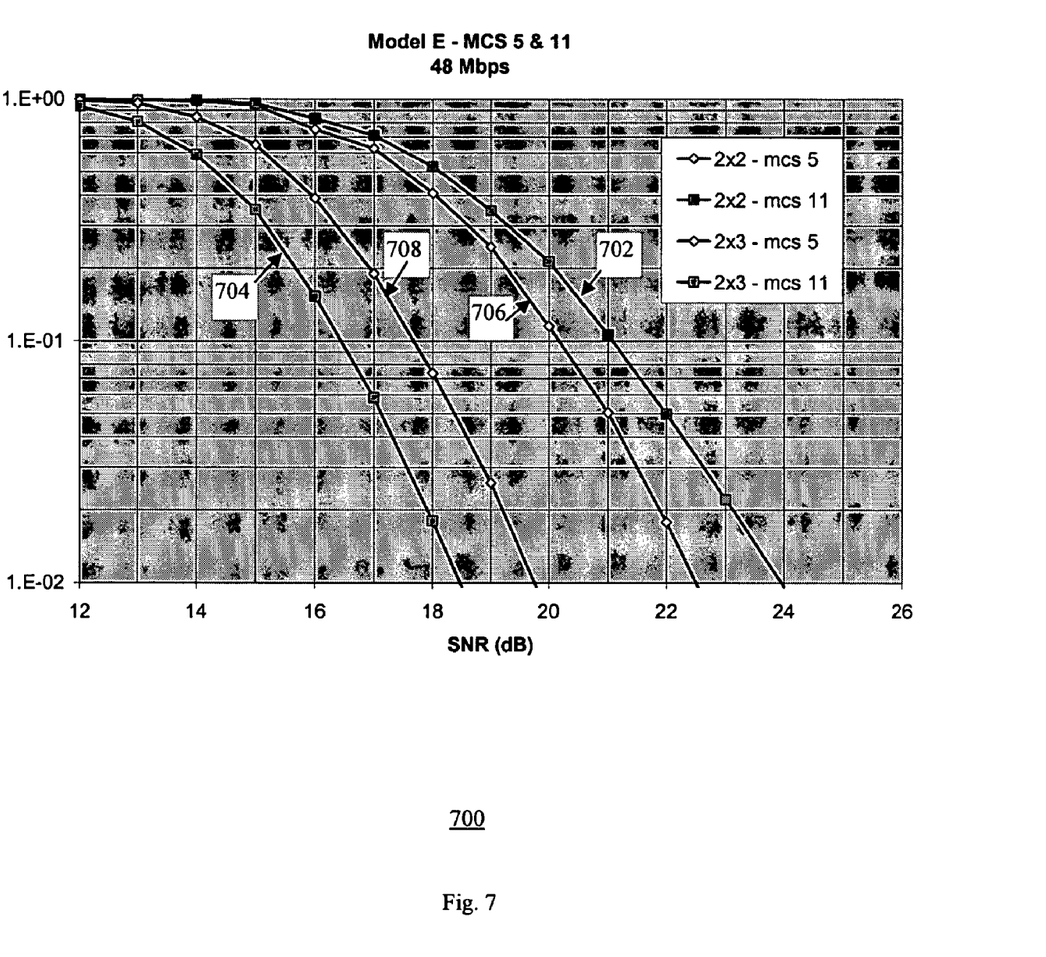
FIG. 7 shows an example PER performance comparison of direct mapping (MCS 11) and Walsh-CDD (MCS 5) over E-NLOS channel.

However, for stations with 3 receiver antennas, MCS 9 with direct mapping performs better. Similar observation is shown for MCS 5 and MCS 11 in examples performance graphs in FIGS. 6-7. Specifically, FIG. 6 shows graphs 600 for PER vs. signal-to-noise-ratio (SNR) performance comparison of direct mapping (MCS 11) (i.e., 2×2 MCS 11 performance graph 602 and 2×3 MCS 11 performance graph 604) and Walsh-CDD (MCS 5) (i.e., 2×2 MCS 5 performance graph 606 and 2×3 MCS 5 performance graph 608) over a D-NLOS channel. Further, FIG. 7 shows graphs 700 for PER vs. signal-to-noise-ratio (SNR) performance comparison of direct mapping (MCS 11) (i.e., 2×2 MCS 11 performance graph 702 and 2×3 MCS 11 performance graph 704) and Walsh-CDD (MCS 5) (i.e., 2×2 MCS 5 performance graph 706 and 2×3 MCS 5 performance graph 708) over a E-NLOS channel.

The system diagrams in FIGS. 1-3 are existing systems in the aforementioned TGn Sync proposal, and FIGS. 4-7 are simulations of those systems in different cases.

C. Smart Switching Between Transmission Modes

Figure 8:
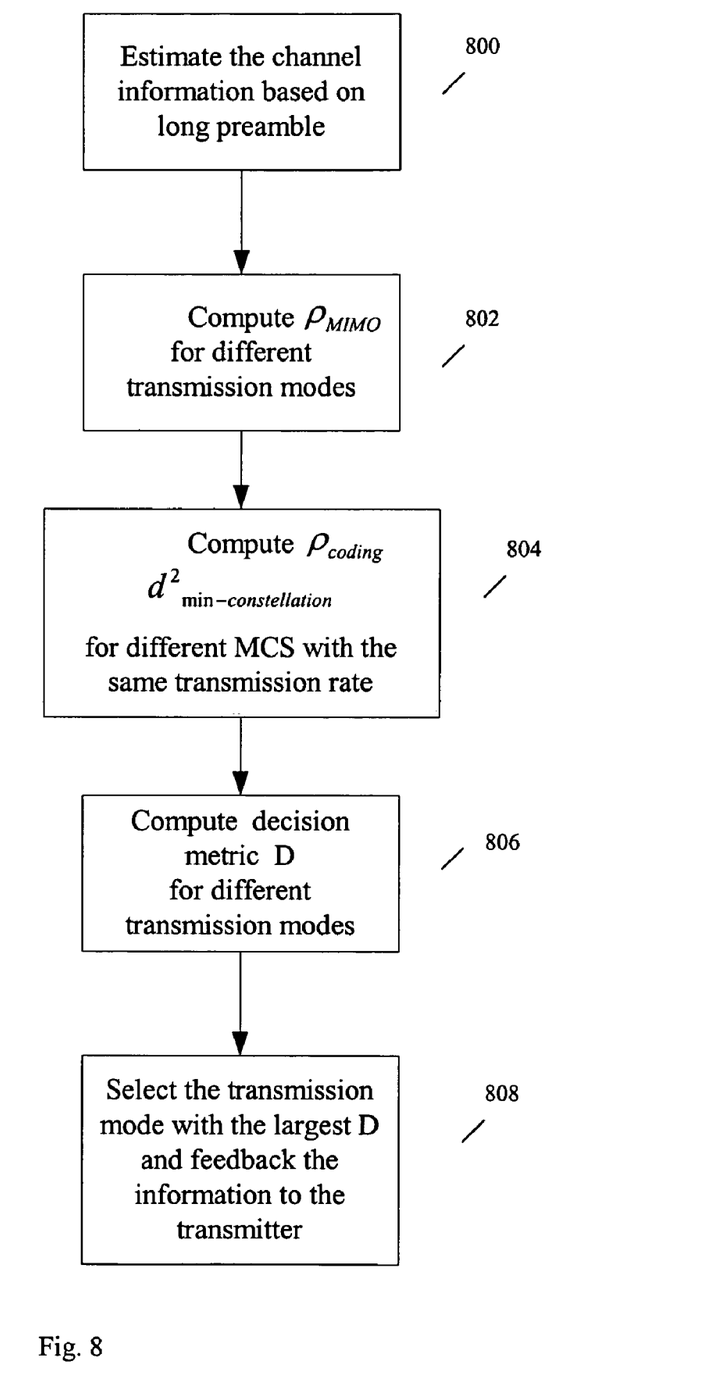
FIG. 8 shows an example flowchart of the steps of an embodiment of a transmission mode selection method according to the present invention.
Figure 9:
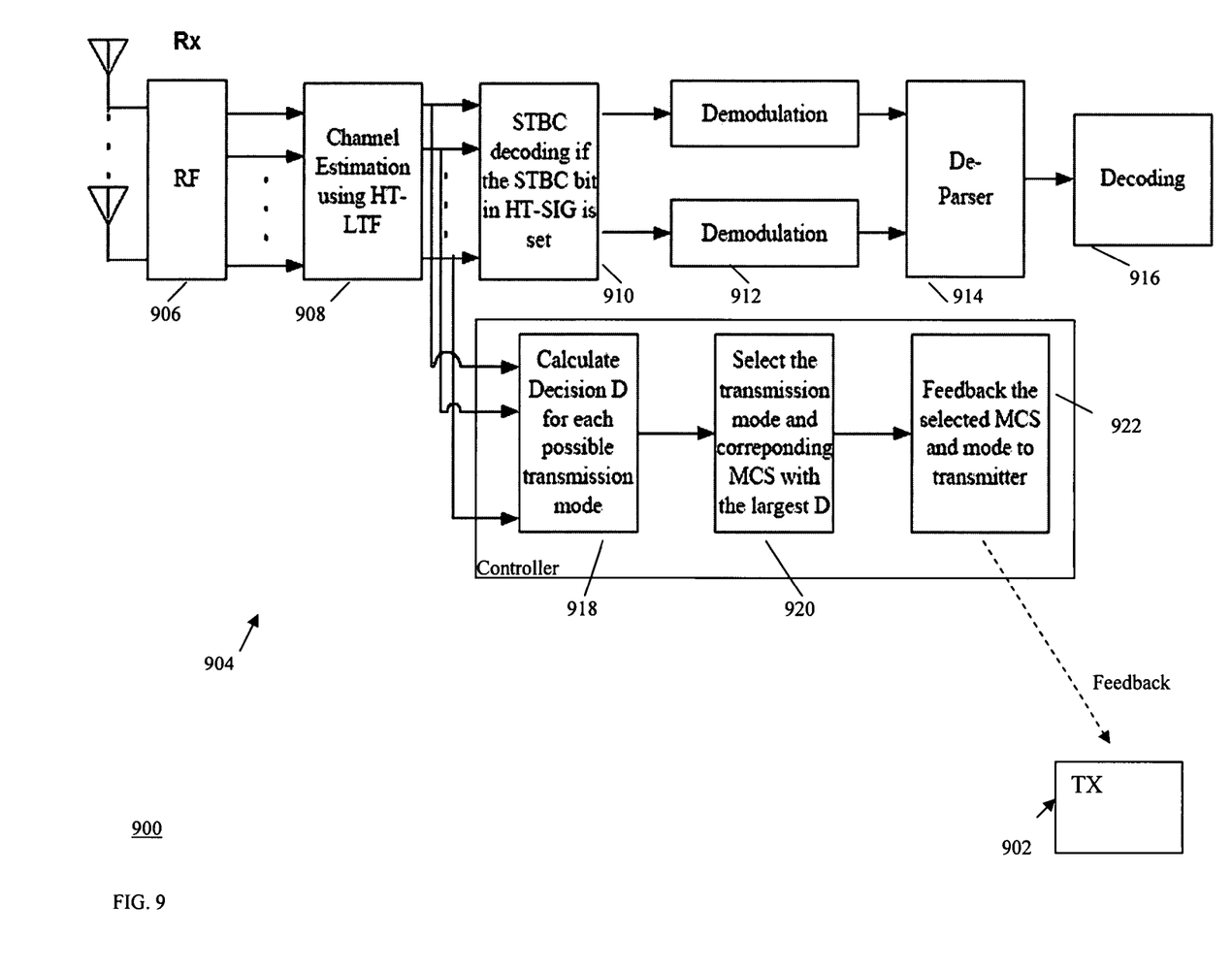
FIG. 9 shows an example system including a transmitter and a receiver implementing the method of FIG. 8, according to an embodiment of the present invention.

Referring to FIGS. 8-9, in one embodiment, the present invention provides smart switching between spatial multiplexing, delay diversity and space-time coding in IEEE 802.11n systems, to achieve the highest throughput out of the three modes. The present invention provides a method of switching modes between spatial multiplexing, delay diversity and space-time coding in IEEE 802.11n systems system based on a newly defined decision metric D termed "Post-detection constellation-coding SNR". The metric D takes into consideration the constellation distance and coding rate, and therefore provides an effective metric to compare different MCSs, wherein MCSs are the transmission rate specified by different coding and modulation combination. For example, MCS 11 represents 16QAM ½ coding and 2 data streams. Transmission mode means different transmission methods such as direct mapping, spatial spreading and STBC. For example, given a 4×2 system with 4 transmit antennas and 2 receive antenna, such a system can support MCS 0-15 which corresponds to all the coding/modulations with the $N_{SS}=1$ or 2. When transmitting the data streams, for example, MCS 11, the system can: (1) choose 2 out of 4 Tx antennas and transmit using direct mapping mode, (2) use all 4 Tx antennas with spatial spreading, or (3) encode the 2 streams by the STBC encoder and then transmit. The present invention provides a method on how to select transmission mode which provides higher throughput.

In one version, the decision metric D can be represented as:

$$D = \rho_{MIMO} + d^2_{min\text{-}constellation} - \rho_{coding} \qquad (1)$$

wherein D is calculated at the receiver, $d^2_{min\text{-}constellation}$ is the squared min-distance of constellation (i.e., a squared min-distance of constellation for different MCS with the same transmission rates), $\rho_{coding}$ is the coding loss of higher coding rate, $\rho_{MIMO}$ is the post-detection SNR. The decision metric D is defined by adjusting the post detection SNR $\rho_{MIMO}$ with SNR loss of the transmission constellation and coding rate. Further, BPSK (Binary Phase Shift Keying), QPSK (Quadrature Phase Shift Keying), 16QAM and 64 QAM are defined for basic MCS set. The corresponding $d^2_{min\text{-}constellation}$ listed in Table I below.

TABLE I

| $d^2_{min\text{-}constellation}$ with corresponding constellations | | |
|---|---|---|
| | $d^2_{min\text{-}constellation}$ | $d^2_{min\text{-}constellation}$ (dB) |
| BPSK | 4 | 6.02 |
| QPSK | $(2/\sqrt{2})^2$ | 3.01 |
| 16QAM | $(2/\sqrt{10})^2$ | −3.98 |
| 64QAM | $(2/\sqrt{42})^2$ | −10.2 |

$\rho_{coding}$ is the coding loss of higher coding rate relative to the rate ½ codes. The values are given in Table II below. Those values are empirical values and further fine tuning can be performed.

TABLE II $\rho_{coding}$ with different coding rate

| | $\rho_{coding}$ (dB) |
|---|---|
| Rate 1/2 codes | 0 |
| Rate 2/3 codes | 2 |
| Rate 3/4 codes | 3 |
| Rate 5/6 codes | 4 |

$\rho_{MIMO}$ is the post-detection SNR, which are defined for different transmission modes. For MIMO mode switching, we define $\rho_{MIMO}$ as listed in Table III below.

TABLE III $\rho_{MIMO}$ with different transmission modes

| | $\rho_{MIMO}$ (dB) |
|---|---|
| Spatial Multiplexing | $\min(1/\text{diag}\{R^\dagger R^{\dagger H}\})$ |
| Spectrum Spreading | $\|Hq\|_F$ |
| Alamouti | $\|H\|_F$ |

$R^\dagger$ is the MIMO equalizer coefficients implemented for a MIMO receiver. $R^\dagger$ can be computed using the MMSE (Minimum Mean Squared Error) criterion or the ZF (Zero Forcing) criterion. $\|H\|_F$ is the Frobenius norm of the H matrix, defined as $$\sum_{j,k} |h_{j,k}|^2.$$

Further, q is the spatial spreading antenna map vector defined as:

$$q = \Phi^{(k)}(D) \frac{1}{\sqrt{N_{Tx}}} \begin{bmatrix} 1 \\ \vdots \\ 1 \end{bmatrix} \quad (2)$$

$$= \frac{1}{\sqrt{N_{Tx}}} \begin{bmatrix} 1 \\ \vdots \\ \exp(-j2\pi k(N_{Tx}-1)\Delta_F D) \end{bmatrix}.$$

This corresponds to a cyclic delay of $i_{Tx}D$ applied to antennas $i_{Tx}=0, \ldots, N_{Tx}-1$. For spatial multiplexing, the equation in Table III is a general form where $N_{SS}$ can be 1 to 4. For spatial spreading and STBC, the above equation in Table III is a simplified computation which is applied to $N_{SS}=1$ only. The case of general $N_{SS}$ is described further below.

FIG. 9 shows a block diagram of an example system 900 including a transmitter TX 902 and a receiver RX 904, according to the present invention. The transmitter 902 can be as described in relation to FIGS. 1, 2 or 3. The receiver 904 comprises, according to an embodiment of the present invention: RF unit 906, channel estimator 908 that estimates the channel using HT-LTF, an STBC decoder 910 that performs STBC decoding when the STBC bit in HT-SIG is set, demodulators 912, de-parser 914, decoder 916, decision metric calculator 918 that calculates the decision metric D for each possible transmission mode, a selector 920 that selects the transmission mode and corresponding MCS with the largest decision metric D and feed back unit 922 that feeds back the selected MCS and mode to the transmitter 902.

The MIMO system 900 in FIG. 9 implements the method shown in flowchart of FIG. 8 which illustrates the above mode selection method, according to the present invention, including the steps of:

Step 800: Estimate the channel information in channel estimator 906 based on long preamble sequence HT-LTF (Long preamble sequence is defined as part of the preamble).

Step 802: Compute the term $\rho_{MIMO}$ for different transmission modes. $\rho_{MIMO}$ is calculated in the calculator 918 based on the equations in Table III discussed above, for rate adaptation.

Step 804: Compute the terms $\rho_{coding}$ and $d^2_{min-Constellation}$ in the calculator 918 for different MCS with the same transmission rates, using rate adaptation in the receiver 904.

Step 806: Compute the decision metric D for different transmission modes in the calculator 918. As such, for each transmission mode, a corresponding decision metric is computed.

Step 808: Select the transmission mode with the largest D utilizing the selector 920, and feedback the information to the transmitter 902 utilizing the feedback unit 922. The rate adaptation module in the MAC layer in the transmitter 902 uses this feedback information and configures the PHY implementation accordingly.

EXAMPLES

In the following, two selection examples are provided. First example is switching between MCS 3 and MCS 9. As shown in FIGS. 4-5, for a 2×2 (i.e., 2 transmit antennas and 2 receive antennas) system, spatial spreading is preferred (MCS 3), and for a 2×3 system, spatial multiplexing is preferred (MCS 9). Spatial multiplexing refers to the direct mapping mode. The ensemble average of decision metric D is calculated over channel DNLOS and ENLOS, averaging over 500 independent channel realizations. The results are shown in Tables IV and V below.

TABLE IV

Decision metric D for 2 × 2 system with MCS 3 and MCS9

| | DNLOS channel | | | ENLOS channel | | |
|---|---|---|---|---|---|---|
| | MCS 9 (Spatial Multiplexing) | MCS 3 (Spatial Spreading) | MCS 3 (STBC) | MCS 9 (Spatial Multiplexing) | MCS 3 (Spatial Spreading) | MCS 3 (STBC) |
| $d^2_{min-constellation}$ | 3.01 (dB) | −3.98 (dB) | −3.98 (dB) | 3.01 (dB) | −3.98 (dB) | −3.98 (dB) |
| $\rho_{coding}$ | 0 (dB) | 0 (dB) | 0 (dB) | 0 (dB) | 0 (dB) | 0 (dB) |
| $\rho_{MIMO}$ | −5.91 (dB) | 3.84 (dB) | 5.70 (dB) | −7.04 (dB) | 1.93 (dB) | 5.83 (dB) |
| D | −2.90 | −0.13 | 1.72 | −4.04 | −2.04 | 1.85 |

TABLE V

Decision metric D for 2 × 3 system with MCS 3 and MCS9

| | DNLOS channel | | | ENLOS channel | | |
|---|---|---|---|---|---|---|
| | MCS 9 (Spatial Multiplexing) | MCS 3 (Spatial Spreading) | MCS 3 (STBC) | MCS 9 (Spatial Multiplexing) | MCS 3 (Spatial Spreading) | MCS 3 (STBC) |
| $d^2_{min-constellation}$ | 3.01 (dB) | −3.98 (dB) | −3.98 (dB) | 3.01 (dB) | −3.98 (dB) | −3.98 (dB) |
| $\rho_{coding}$ | 0 (dB) | 0 (dB) | 0 (dB) | 0 (dB) | 0 (dB) | 0 (dB) |
| $\rho_{MIMO}$ | 1.43 (dB) | 5.63 (dB) | 7.51 (dB) | −1.10 (dB) | 4.14 (dB) | 7.18 (dB) |
| D | 4.44 | 1.65 | 3.53 | 1.91 | 0.16 | 3.20 |

Comparing FIGS. 4 and 5, the mode selection based on metric D match well with the PER simulation for all configurations (i.e., different MCS and transmission mode combinations). For example, in a 2×2 system channel DNLOS, for 24 Mbps transmission rate, we see D=−2.9 for direct mapping with MCS 9 which is smaller than D=−0.13 for the spatial spreading case with MCS 3. This means that in a 2×2 system, spatial spreading is preferred over direct mapping. This result matches well the simulation shown in FIG. 4 (402 and 406). Another example, in a 2×3 system channel DNLOS, for 24 Mbps transmission rate, we see D=4.44 for direct mapping with MCS 9 which is larger than D=1.65 for the spatial spreading case with MCS 3. This means that in a 2×3 system, direct mapping is preferred over spreading. This result matches the simulation shown in FIG. 4 (404 and 408).

The second example is switching between MCS 5 and MCS 11. In this case, both the constellation and coding rate are different. The ensemble average of decision metric D over channel DNLOS and ENLOS is calculated, averaging over 500 independent channel realizations. The results are shown in Tables VI and VII below.

TABLE VI

Decision metric D for 2 × 2 system with MCS 5 and MCS 11

| | DNLOS channel | | | ENLOS channel | | |
|---|---|---|---|---|---|---|
| | MCS 11 (Spatial Multiplexing) | MCS 5 (Spatial Spreading) | MCS 5 (STBC) | MCS 11 (Spatial Multiplexing) | MCS 5 (Spatial Spreading) | MCS 5 (STBC) |
| $d^2_{min-constellation}$ | −3.98 (dB) | −10.2 (dB) | −10.2 (dB) | −3.98 (dB) | −10.2 (dB) | −10.2 (dB) |
| $\rho_{coding}$ | 0 (dB) | 2 (dB) | 2 (dB) | 0 (dB) | 2 (dB) | 2 (dB) |
| $\rho_{MIMO}$ | −5.91 (dB) | 3.84 (dB) | 5.70 (dB) | −7.04 (dB) | 1.93 (dB) | 5.83 (dB) |
| D | −9.89 | −8.36 | −6.51 | −11.03 | −10.28 | −6.38 |

TABLE VII

Decision metric D for 2 × 3 system with MCS 5 and MCS 11

| | DNLOS channel | | | ENLOS channel | | |
|---|---|---|---|---|---|---|
| | MCS 11 (Spatial Multiplexing) | MCS 5 (Spatial Spreading) | MCS 5 (STBC) | MCS 11 (Spatial Multiplexing) | MCS 5 (Spatial Spreading) | MCS 5 (STBC) |
| $d^2_{min-constellation}$ | −3.98 (dB) | −10.2 (dB) | −10.2 (dB) | −3.98 (dB) | −10.2 (dB) | −10.2 (dB) |
| $\rho_{coding}$ | 0 (dB) | 2 (dB) | 2 (dB) | 0 (dB) | 2 (dB) | 2 (dB) |

TABLE VII-continued

Decision metric D for 2 × 3 system with MCS 5 and MCS 11

| | DNLOS channel | | | ENLOS channel | | |
|---|---|---|---|---|---|---|
| | MCS 11 (Spatial Multiplexing) | MCS 5 (Spatial Spreading) | MCS 5 (STBC) | MCS 11 (Spatial Multiplexing) | MCS 5 (Spatial Spreading) | MCS 5 (STBC) |
| $\rho_{MIMO}$ | 1.43 (dB) | 5.63 (dB) | 7.51 (dB) | −1.10 (dB) | 4.14 (dB) | 7.18 (dB) |
| D | −2.55 | −6.59 | −4.70 | −5.08 | −8.07 | −5.03 |

Comparing FIGS. 6 and 7, MCS 5 is preferred for 2×2 system, while MCS 11 is preferred for 2×3 system. The mode selection based on metric D match well with the PER simulation for all configurations.

As those skilled in the art will recognize, the present invention can be extended to DSTBC (Double Space time block codes) transmission when $N_{SS}=2$, and $N_{Tx}=4$. The values $d^2_{min-constellation}$ and $\rho_{coding}$ are calculated as above. The $\rho_{MIMO}$ is defined as $\min(\|H_1\|_F, \|H_2\|_F)$ where $H_1$. is the first two rows of channel matrix H, corresponding to the channel of the first data stream, and $H_2$ are the third and fourth row of the channel matrix H, corresponding to the second data stream. There is no STBC scheme specified for MCS 17-31 in the aforementioned TGn Sync specification.

Similarly, calculation of the decision metric D can be extended to spatial spreading with $N_{SS}>1$. For the spatial spreading case, the $\rho_{MIMO}$ is calculated as $\min(1/\text{diag}\{R^\dagger R^{\dagger H}\})$ where $R^\dagger$ is the MIMO equalizer coefficients computed from the equivalent channel coefficient HQ, using the MMSE (Minimum Mean Squared Error) criterion or the ZF (Zero Forcing) criterion. Q is the spatial spreading matrix.

For beamforming transmission with basic MCS, i.e., data coding and modulation scheme for each data scheme, the metric D can be as defined for the spatial spreading scheme, where Q is the eigen-steering vector used in beamforming. When power loading is used over beamforming, extra power loading gain in dB is added, which results in $\rho_{MIMO}=\min(1/\text{diag}\{R^\dagger R^{\dagger H}\}+\text{diag}(P_1, P_2, \ldots, P_{Nss}))$, $R^{554}$ is the MIMO equalizer coefficients computed from the equivalent channel coefficient HQ, using the MMSE (Minimum Mean Squared Error) criterion or the ZF (Zero Forcing) criterion. Q is the eigen-steering matrix. The above scheme cannot be used for beamforming with extended MCS set.

As such, the present invention provides a method and system for choosing transmission modes between spatial multiplexing, delay diversity and space-time coding in 802.11n systems. As such, eigen-value computation for mode selection is not required. This provides efficiency, in particular for basic receiver structure where a linear MMSE or ZF MIMO detector is applied. Further, mode selection using a simple metric provides accurate mode selection. In addition by switching between different transmission modes, a link adaptation algorithm according to the present invention (e.g., steps in FIG. 8 as implemented in system of FIG. 9) provides improved system performance.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of switching between transmission modes in an IEEE802.11n wireless communication system, comprising steps of:
   determining, by a receiver, a decision metric as a function of post-detection constellation-coding SNR, said determining including:
     estimating communication channel information based on long preamble;
     computing a squared min-distance of constellation for different MCS (modulation coding scheme) with the same transmission rates; and
     selecting between transmission modes based on the decision metric.

2. The method of claim 1, wherein selecting between transmission modes further includes selecting between spatial multiplexing, delay diversity and space-time coding transmission modes based on the decision metric.

3. The method of claim 2 further including comparing MCS of different transmission modes using the decision metric.

4. The method of claim 3 wherein selecting between transmission modes further includes selecting between transmission modes based on the decision metric to achieve the best system performance.

5. The method of claim 1, wherein determining a decision metric further includes determining a decision metric as a function of a constellation distance and coding rate.

6. The method of claim 5 wherein determining a decision metric further includes:
   computing a post-detection SNR ($\rho_{MIMO}$) for different transmission modes;
   computing a coding loss of higher coding rate ($\rho_{coding}$); and
   computing a decision metric D for each transmission mode, such that each transmission mode has a corresponding decision metric.

7. The method of claim 6 wherein selecting the transmission modes further includes switching between the transmission modes based on the decision metric of each transmission mode.

8. The method of claim 6 wherein selecting the transmission modes further includes selecting the transmission mode with the largest decision metric.

9. The method of claim 8 wherein the communication system comprises a transmitter and a receiver, the method further comprising feeding back the selection information to the transmitter for switching between transmission modes accordingly.

10. The method of claim 6 wherein computing a decision metric D for each transmission mode further includes for each transmission mode computing:

$$D=\rho_{MIMO}d^2_{min-constellation}-\rho_{coding}.$$

where ($d^2_{min-constellation}$) is the squared min-distance of constellation for different MCS with the same transmission rates.

11. The method of claim 10, wherein eigen-value computation for transmission mode selection is not performed.

12. The method of claim 10, wherein the communication system comprises a MIMO system.

13. A controller for switching between transmission modes in an IEEE802.11n wireless communication system, comprising:
   a decision metric calculator configured for determining a decision metric as a function of post-detection constellation-coding SNR by:
      estimating communication channel information based on long preamble;
      computing a squared min-distance of constellation for different MCS (modulation coding scheme) with the same transmission rates; and
   a selector that selects between transmission modes based on the decision metric.

14. The controller of claim 13, wherein the selector selects between transmission modes further by selecting between spatial multiplexing, delay diversity and space-time coding transmission modes based on the decision metric.

15. The controller of claim 14 further including means for comparing MCS of different transmission modes using the decision metric.

16. The controller of claim 15 wherein the selector selects between transmission modes further by selecting between transmission modes based on the decision metric to achieve the best system performance.

17. The controller of claim 16, wherein the decision metric calculator determines the decision metric further by determining a decision metric as a function of post detection SNR, a constellation distance and coding rate.

18. The controller of claim 17 wherein the decision metric calculator determines the decision metric further by:
   computing a post-detection SNR ($\rho_{MIMO}$) for different transmission modes;
   computing a coding loss of higher coding rate ($\rho_{coding}$); and
   computing a decision metric D for each transmission mode, such that each transmission mode has a corresponding decision metric.

19. The controller of claim 18 wherein the selector selects the transmission modes further by switching between the transmission modes based on the decision metric of each transmission mode.

20. The controller of claim 18 wherein the selector selects the transmission modes further by selecting the transmission mode with the largest decision metric.

21. The controller of claim 20 wherein the communication system comprises a transmitter and a receiver, such that the controller further feeds back the selection information to the transmitter for switching between transmission modes accordingly.

22. The controller of claim 18 wherein decision metric calculator computes the decision metric D for each transmission mode further by, for each transmission mode, computing:

$$D = \rho_{MIMO} + d^2_{min-constellation} - \rho_{coding},$$

where ($d^2_{min-constellation}$) is the squared min-distance of constellation for different MCS with the same transmission rates.

23. The controller of claim 22, wherein eigen-value computation for transmission mode selection is not performed.

24. The controller of claim 22, wherein the communication system comprises a MIMO system.

25. The controller of claim 18, wherein post-detection SNR ($\rho_{MIMO}$) for direct mapping mode is determined as $\min(1/\text{diag}\{R^\dagger R^{\dagger H}\})$, where $R^\dagger$ is the MIMO equalizer coefficients computed using MMSE (Minimum Mean Squared Error) criterion or ZF (Zero Forcing) criterion.

26. The controller of claim 18, wherein post-detection SNR ($\rho_{MIMO}$) for spatial spreading mode with number of spatial streams $N_{ss}=1$ is determined as $\|Hq\|_F$ where $\|H\|_F$ is the Frobenius norm of the H matrix, defined as $\Sigma_{j,k}|h_{j,k}|^2$, and q is the spatial spreading antenna map vector.

27. The controller of claim 18, wherein post-detection SNR ($\rho_{MIMO}$) for spatial spreading mode with number of spatial streams $N_{ss}>1$ is determined as $\min(1/\text{diag}\{R^\dagger R^{\dagger H}\})$ where $R^\dagger$ is the MIMO equalizer coefficients based on the equivalent channel coefficient HQ, using the MMSE (Minimum Mean Squared Error) criterion or the ZF criterion, and Q is the spatial spreading matrix.

28. The controller of claim 27 wherein the $\rho_{coding}$ values are further optimized based on detailed implementation codes.

29. The controller of claim 18, wherein post-detection SNR ($\rho_{MIMO}$) for STBC (Space-Time Block Coding) mode with number of spatial streams $N_{ss}=1$ is determined as $\|H\|_F$ where $\|H\|_F$ is the Frobenius norm of the H matrix, defined as $\Sigma_{j,k}|h_{j,k}|^2$.

30. The controller of claim 18, wherein post-detection SNR ($\rho_{MIMO}$) for STBC (Space-Time Block Coding) mode with number of spatial streams $N_{ss}=2$ is determined as $\min(\|H_1\|_F, \|H_2\mu_F)$ where $H_1$ is first of two rows of channel matrix H, corresponding to the channel of the first data stream, and $H_2$ are the third and fourth rows of the channel matrix H, corresponding to the second data stream.

31. The controller of claim 18, wherein post-detection SNR ($\rho_{MIMO}$) for basic beamforming mode with power loading is determined as $\rho_{MIMO} = \min(1/\text{diag}\{R^\dagger R^{\dagger H}\} + \text{diag}(P_1, P_2, \ldots, P_{Nss}))$, where $R^\dagger$ is the MIMO equalizer coefficients based on the equivalent channel coefficient HQ, using the MMSE (Minimum Mean Squared Error) criterion or the ZF (Zero Forcing) criterion, Q is the eigen-steering matrix.

32. The controller of claim 18, wherein coding loss of higher coding rate ($\rho_{coding}$) is determined as:

| | $\rho_{coding}$ (dB) |
|---|---|
| Rate 1/2 codes | 0 |
| Rate 2/3 codes | 2 |
| Rate 3/4 codes | 3 |
| Rate 5/6 codes | 4. |

33. The controller of claim 18, wherein a squared mm-distance of constellation ($d^2_{min-constellation}$) for different MCS with the same transmission rates is determined as:

| | $d^2_{min-constellation}$ | $d^2_{min-constellation}$ (dB) |
|---|---|---|
| BPSK | 4 | 6.02 |
| QPSK | $(2/\sqrt{2})^2$ | 3.01 |
| 16QAM | $(2/\sqrt{10})^2$ | −3.98 |
| 64QAM | $(2/\sqrt{42})^2$ | −10.2. |

34. A method of switching between transmission modes in an IEEE802.11n wireless communication system, comprising steps of:
   Determining, by a receiver, a decision metric as a function of post-detection constellation-coding SNR including:

determining a decision metric as a function of a constellation distance and coding rate;
  estimating communication channel information based on long preamble;
  computing a post-detection SNR (PMIMO) for different transmission modes;
  computing a coding loss of higher coding rate (P coding);
  computing a squared min-distance of constellation (d^2 min_constellation) for different MCS (modulation coding scheme) with the same transmission rates; and
  computing a decision metric D for each transmission mode, such that each transmission mode has a corresponding decision metric; and
selecting between transmission modes based on the decision metric.

35. A controller for switching between transmission modes in an IEEE802.11n wireless communication system, comprising:

a decision metric calculator configured for determining a decision metric as a function of post-detection constellation-coding SNR, a constellation distance and coding rate, the decision metric calculator further configured for:
  estimating communication channel information based on long preamble;
  computing a post-detection SNR ($\rho_{MIMO}$) for different transmission modes;
  computing a coding loss of higher coding rate ($\rho_{coding}$);
  computing a squared min-distance of constellation ($d^2_{min\text{-}constellation}$) for different MCS (modulation coding scheme) with the same transmission rates; and
  computing a decision metric D for each transmission mode, such that each transmission mode has a corresponding decision metric; and
a selector that selects between transmission modes based on the decision metric.

* * * * *